R. L. CURRAN.
PHOTOGRAPHIC DIAPHRAGM.
APPLICATION FILED JULY 5, 1919.
1,368,608. Patented Feb. 15, 1921.
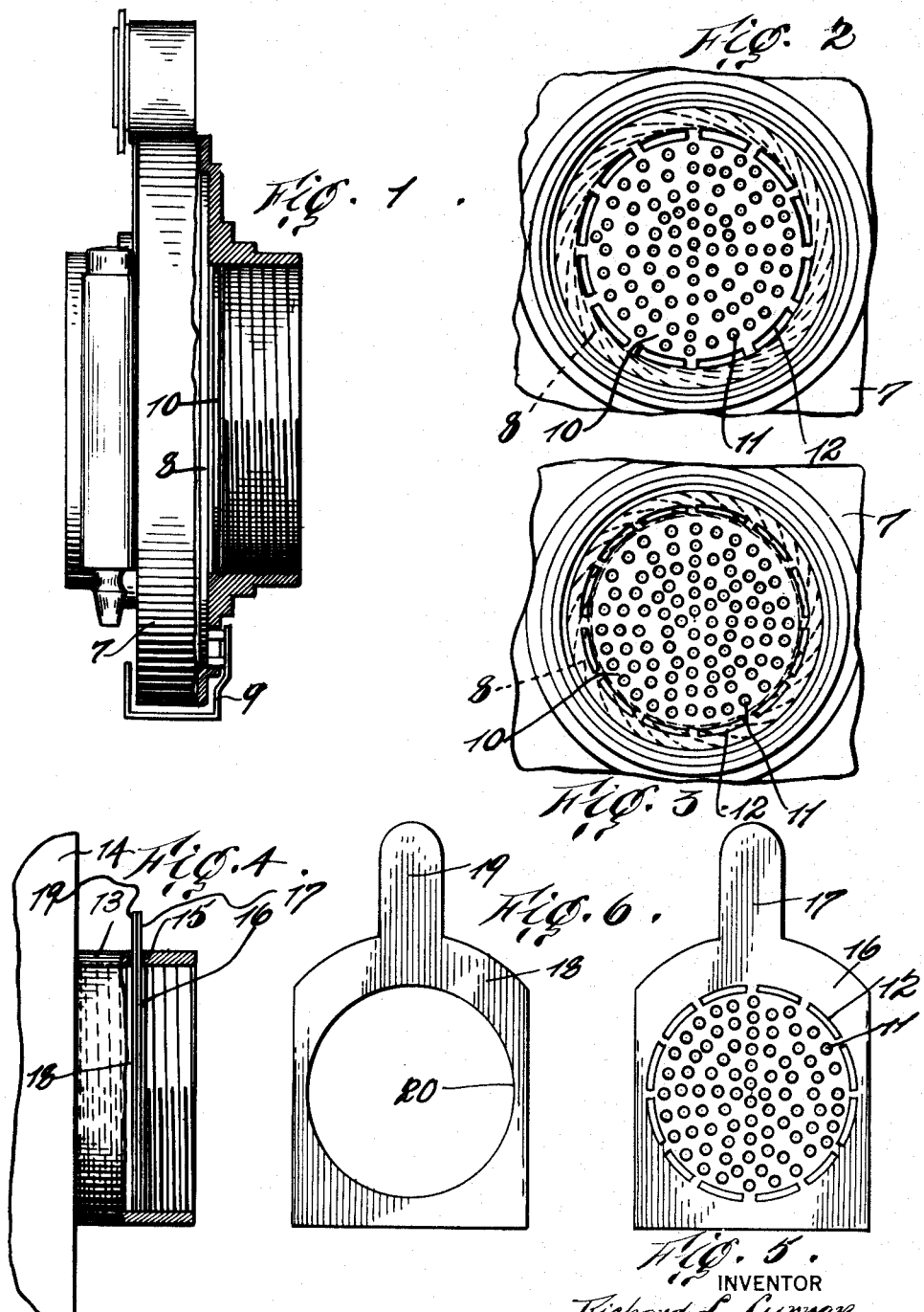
INVENTOR
Richard L. Curran
BY
Philip B. Keck
ATTORNEY

UNITED STATES PATENT OFFICE.

RICHARD L. CURRAN, OF WEST CALDWELL, NEW JERSEY.

PHOTOGRAPHIC DIAPHRAGM.

1,368,608.  Specification of Letters Patent.  Patented Feb. 15, 1921.

Application filed July 5, 1919. Serial No. 308,763.

*To all whom it may concern:*

Be it known that I, RICHARD L. CURRAN, a citizen of the United States, and a resident of West Caldwell, in the county of Essex and State of New Jersey, have invented certain new and useful Improvements in Photographic Diaphragms, of which the following is a specification, reference being made to the accompanying drawings, forming a part thereof.

My invention relates to those diaphragms, which are used in connection with photographic camera-lenses to restrain, diffuse or modify the rays of light passing through such lenses whereby "soft-focus" effects are produced in the resulting photograph or picture. Heretofore it has been customary to produce such effects by means of special lenses in conjunction with the ordinary photographic lenses, but such special lenses are hard to manipulate, and furthermore do not always produce the advantageous softness of the hard outlines and minute details of the object without losing more or less entirely such details as are necessary to produce the desired result.

The objects of my invention are, among other things, to dispense with the use of special soft-focus lenses and to provide an improved form of photographic diaphragm which may be readily inserted into the barrel of the usual double lenses, which diaphragm will be so made and thereafter adjusted to the rays of light that a distinctly soft-focus effect will be produced in the resulting picture caused by diffusion of some of the light rays passing through a multitude of minute holes in the diaphragm, while modifying or varying the resultant of such diffusion by admitting through such lenses and the interposed diaphragm a variable amount of undiffused light, that is to say, rays that have passed freely through the lenses and diaphragm without change or retardation. My improved diaphragm can be used both for portraits and views of landscapes, and is also adapted for enlargements. The use of a plurality of minute holes in the diaphragm gains in strength of light and shortens the time of exposure which is of considerable importance in producing desirable pictures.

Further advantages and functions of my improved photographic diaphragm will hereinafter be more particularly set forth, and a preferred embodiment of my invention is illustrated in the accompanying drawings in which—

Figure 1 is a side elevation of the barrel for the photographic lenses in which my improved diaphragm is carried, such barrel for the photographic lenses being partly in vertical section;

Fig. 2 is an end view of the diaphragm with the iris diaphragm open;

Fig. 3 is a view similar to Fig. 2 with the iris diaphragm closing the circumferential openings in the diaphragm.

Fig. 4 is a side elevation, partly in vertical section, of a lens barrel showing a modified form of the invention;

Fig. 5 is an end view of another form of my improved diaphragm adapted for use in the Fig. 4 construction; and Fig. 6 is an end view of a form of slide to be used in place of the iris diaphragm shown in Figs. 2 and 3.

Similar numerals refer to similar parts throughout the several figures.

Referring to Fig. 1, the barrel 7 for the two lenses (not shown) is of the usual construction having the customary shutter attachments and also the iris diaphragm 8 actuated by the lever 9 to vary the size of the opening through which the full light passes from lens to lens. Adjacent the diaphragm 8 is inserted the diaphragm 10 in any convenient manner, this diaphragm preferably made of a celluloid film or thin metallic plate. Radially disposed from the center of the diaphragm 10 are arranged a plurality of very minute holes 11 varying in diameter from one-thirtieth (1/30) to one-sixtieth (1/60) of an inch. The holes 11 are uniformly spaced apart one from another, and are all of substantially the same size in the particular diaphragm. Care should be taken not to make the holes 11 so close together as to fill more than one-half of the area of the diaphragm 10, and it is also advisable to blacken the inner edges of the holes 11 so as to render same as non-reflective as possible. Light in passing through such minute holes is diffracted, as I believe, and thereafter diffused. Upon the outer margin of the diaphragm 10 elongated arcuate openings 12 are formed therein as shown in Figs. 2 and 3, these openings 12 all being equi-distant from the center of the diaphragm 10 and each opening 12 having the same width in the particular diaphragm used. The width of the openings 12 varies with the size of the particular diaphragm, that is to say when the area containing the holes 11 within the openings 12 is large the width of such openings 12 is correspondingly larger than those openings 12 employed in a diaphragm of smaller area so that the relative areas of the diaphragm with minute holes therein, and of the openings 12 may be more or less constant, but coupled with the control of such openings by the use of the iris diaphragm 8 to regulate the amount of full light received to modify the diffused light passing through the holes 11.

In Fig. 4, I have shown the lens barrel 13 attached to the camera 14, having the slit 15 through which the diaphragm 16 (shown in Fig. 5) may be inserted by the handle 17; in Fig. 6, I have shown a form of slide 18 with its handle 19 which is adapted to be inserted into the barrel 13 through the slit 15 contiguous to the diaphragm 16 as shown in Fig. 4. The diaphragm 16 is formed in the same manner as the diaphragm 10 with a plurality of minute holes 11 and also the circumferential openings 12 as shown. The circular opening 20 in the slide 18 is of such diameter as to partially close the openings 12 in the diaphragm 16, and it is obvious that the amount of light passing through such openings 12 may be regulated and controlled by the use of different slides 18 having the opening 20 of slightly variable sizes, so as to increase, diminish, or shut off altogether the amount of light passing through such openings 12 in the diaphragm 16. Shutter wings may also be utilized to control the size of the openings 12, such wings being made a permanent part of the lens. In both forms of construction, the arcuate openings 12 introduce a considerable volume of undiffracted light which tends to overcome or modify the diffused effect from the diffracted light passing through the minute holes 11, but the desired soft-focus effects in the resulting picture gradually increase as the light admitted through the openings 12 is diminished as hereinbefore described.

The operation of my improved diaphragm is substantially as follows: The light in passing through the lenses is diffracted and diffused by passing through the multitude of minute holes 11 which diffusion results in the desired soft-focus effects in the resulting picture, but I have discovered that a total diffusion of all the light passing through the lenses is often highly disadvantageous, and that the diffused light passing through the holes 11 should be modified to different degrees by the admission of a variable amount of non-diffused light through the arcuate openings 12, the amount of such full light passing through the openings 12 being controlled either by the iris diaphragm 8 through the lever 9, or by the proper slide 18. It is obvious from the use of my improved diaphragm that the gradual shutting off of the openings 12 so modifies the amount of diffusion produced by the minute holes 11 that a pleasing softness of the hard outlines of the object photographed is attained in the resulting picture. The location of my diaphragm in the barrel of the lenses is an advantage because it leaves the free end of the lens for diaphragms having other purposes in photography.

It will be understood that the photographic diaphragm herein shown and described is a preferred embodiment of my invention and that the same may be modified and changed in its various details without departing from the principle and scope of my invention and without sacrificing any of its advantages.

I claim as my invention:

1. A photographic diaphragm consisting of a plate having a plurality of minute holes disposed therein about the center and a series of elongated arcuate openings arranged about said minute holes equidistantly from the center.

2. A photographic diaphragm consisting of a plate having a plurality of minute, light-diffracting spaced-apart, holes disposed therein about the center and a series of relatively large openings arranged about said minute holes equidistantly from the center.

3. A photographic diaphragm consisting of a plate having a plurality of minute holes disposed therein about the center and a series of elongated arcuate openings of equal width arranged about said minute holes equidistantly from the center.

4. A photographic diaphragm consisting of a plate having a plurality of minute, light-diffracting spaced-apart holes disposed therein about the center and a series of relatively large openings of equal width arranged about said minute holes equidistantly from the center.

5. The combination with a photographic lens barrel of a diaphragm consisting of a plate having a plurality of minute holes disposed therein about the center and a series of arcuate openings arranged about said minute holes, said diaphragm being insertible in said barrel, and means for varying the amount of light passing through said openings.

6. The combination with a photographic lens barrel of a diaphragm consisting of a plate having a plurality of minute holes disposed therein about the center and a series of arcuate openings arranged about said minute holes, said diaphragm being insertible in said barrel, and means, carried by said barrel, for varying the amount of light passing through such openings.

7. The combination with a photographic lens barrel of a diaphragm consisting of a plurality of minute uniformly spaced-apart holes disposed therein about the center and a series of elongated light-diffracting spaced-apart arcuate openings arranged about said minute holes equi-distantly from the center, said diaphragm being insertible in said barrel, and means for varying the amount of light passing through said openings.

8. The combination with a photographic lens barrel of a diaphragm consisting of a plurality of minute uniformly spaced-apart holes disposed therein about the center and a series of elongated light-diffracting spaced-apart arcuate openings arranged about said minute holes equi-distantly from the center, said diaphragm being insertible in said barrel, and means for uniformly varying the amount of light passing through said openings.

9. A photographic diaphragm consisting of a plate having a plurality of minute holes formed therein about the center and a series of relatively large openings symmetrically arranged in a concentric band about said minute holes.

10. A photographic diaphragm consisting of a plate having a plurality of minute, light-diffracting holes formed therein about the center and a series of relatively large openings symmetrically arranged in a concentric band about said minute holes.

11. The combination with a photographic lens barrel of a diaphragm consisting of a plate having a plurality of minute holes formed therein about the center and a series of relatively large openings symmetrically arranged in a concentric band about said minute holes, said diaphragm being insertible in said barrel, and means for varying the amount of light passing through such openings.

12. The combination with a photographic lens barrel of a diaphragm consisting of a plate having a plurality of minute, light-diffracting holes formed therein about the center and a series of relatively large openings symmetrically arranged in a concentric band about said minute holes, said diaphragm being insertible in said barrel, and means for varying the amount of light passing through such openings.

RICHARD L. CURRAN.